US011895478B2

(12) United States Patent
Lecomte et al.

(10) Patent No.: US 11,895,478 B2
(45) Date of Patent: Feb. 6, 2024

(54) SOUND CAPTURE DEVICE WITH IMPROVED MICROPHONE ARRAY

(71) Applicants: Orange, Issy-les-Moulineaux (FR); Universite Du Mans, Le Mans (FR)

(72) Inventors: Pierre Lecomte, Le Mans (FR); Rozenn Nicol, Chatillon (FR); Laurent Simon, Le Mans (FR); Manuel Melon, Le Mans (FR); Katell Peron, Chatillon (FR); Cyril Plapous, Chatillon (FR); Kais Hassan, Le Mans (FR)

(73) Assignees: Orange; Universite Du Mans

( * ) Notice: Subject to any disclaimer, the term of this patent is extended or adjusted under 35 U.S.C. 154(b) by 208 days.

(21) Appl. No.: 17/622,679

(22) PCT Filed: May 20, 2020

(86) PCT No.: PCT/FR2020/050852
§ 371 (c)(1),
(2) Date: Dec. 23, 2021

(87) PCT Pub. No.: WO2020/260780
PCT Pub. Date: Dec. 30, 2020

(65) Prior Publication Data

US 2022/0256302 A1 Aug. 11, 2022

(30) Foreign Application Priority Data

Jun. 24, 2019 (FR) ...................................... 1906840

(51) Int. Cl.
*H04S 3/02* (2006.01)
*H04R 1/40* (2006.01)
*H04R 3/00* (2006.01)

(52) U.S. Cl.
CPC ............... *H04S 3/02* (2013.01); *H04R 1/406* (2013.01); *H04R 3/005* (2013.01);
(Continued)

(58) Field of Classification Search
None
See application file for complete search history.

(56) References Cited

U.S. PATENT DOCUMENTS 6,904,152 B1 * 6/2005 Moorer .................. H04S 5/005 381/61
7,782,710 B1 8/2010 Uzes
(Continued)

FOREIGN PATENT DOCUMENTS

FR 3060830 A1 6/2018

OTHER PUBLICATIONS

Pomberger et al., "An Ambisonics Format for Flexible Playback Layouts", Ambisonics Symposium, Graz, Austria, Jun. 27, 2009, pp. 1-8.

(Continued)

*Primary Examiner* — Paul W Huber
(74) *Attorney, Agent, or Firm* — Knobbe, Martens, Olson & Bear, LLP

(57) ABSTRACT

A sound capture device is disclosed, including plural microphone capsules, distributed over portion P of sphere S circumscribed between two or three planes perpendicular to each other, the three planes intersecting at a point corresponding to the center of the sphere S, and the two planes intersecting at a straight line passing through the center of the sphere S, and the sphere portion P being such that P=n S/8, with n=1,2; and a processing unit connected to the capsules to receive the signals captured by the capsules. The processing unit is arranged to matrix the signals in an ambisonic representation which retains only the ambisonic components associated with spherical harmonics that are symmetrical in relation to at least two of the aforementioned planes, and process a matrix thus obtained to identify a
(Continued)

sound source surrounding the sphere portion and interpret a sound signal from the source.

14 Claims, 5 Drawing Sheets

(52) U.S. Cl.
CPC .... *H04R 2201/401* (2013.01); *H04S 2400/01* (2013.01); *H04S 2400/15* (2013.01); *H04S 2420/11* (2013.01)

(56) References Cited

U.S. PATENT DOCUMENTS

| | | | | |
|---|---|---|---|---|
| 9,628,905 | B2 * | 4/2017 | Elko | H04R 1/326 |
| 10,657,974 | B2 * | 5/2020 | Kim | G10L 19/008 |
| 10,721,559 | B2 * | 7/2020 | Thomas | H04R 3/005 |
| 10,770,087 | B2 * | 9/2020 | Kim | G10L 19/038 |
| 10,951,969 | B2 * | 3/2021 | Sano | H04R 1/342 |

OTHER PUBLICATIONS

International Search Report for International Application No. PCT/FR2020/050852, dated Oct. 6, 2020.

* cited by examiner

SOUND CAPTURE DEVICE WITH IMPROVED MICROPHONE ARRAY

CROSS-REFERENCE TO RELATED APPLICATIONS

This application is filed under 35 U.S.C. § 371 as the U.S. National Phase of Application No. PCT/FR2020/050852 entitled "SOUND PICKUP DEVICE WITH IMPROVED MICROPHONE NETWORK" and filed May 20, 2020, and which claims priority to FR 1906840 filed Jun. 24, 2019, each of which is incorporated by reference in its entirety.

BACKGROUND

Field

The invention relates to an acoustic capture device intended to be integrated into a building, for domestic use (context of home automation—connected home) or professional use (business context).

For example, this device aims to capture the sounds present in a room in order to feed an ambient intelligence system composed of a set of sensors and actuators that allow controlling the parameters (for example temperature, light, or others) and the corresponding devices of the building (connected objects in particular such as a connected heating system, connected lamps, etc.).

Description of the Related Technology

The capture of ambient sounds in this context poses several problems.

The sounds to be captured may be located anywhere in a room. It is not possible to know their position beforehand and to position the sound capture equipment accordingly. It is therefore necessary to have a capture device capable of covering the entire space uniformly.

However, for reasons of cost and space, covering the surfaces of the room with microphones is not possible. It is therefore also necessary to seek to minimize the total number of sensors.

The visual appearance of the room can also be a limiting parameter. The aesthetics of the room should not be marred by a multitude of capture devices. It is therefore necessary to favor discreet and compact capture devices.

Today's acoustic capture solutions do not satisfy all of these constraints. It is a question of audio ambient intelligence.

Concerning connected objects, generally typically equipped with audiovisual monitoring devices with embedded camera and microphones, the number of sensors is insufficient to offer a wide acoustic capture coverage. They are limited to nearby sound sources. At least for distant sources, the signal-to-noise ratio (due to ambient noise and reverberation) is unfavorable and does not allow reliable analysis of the signals received.

Also known are voice assistants which currently provide good performance in voice recognition in order to improve the quality of interactions with a user. They are equipped with an array of microphones (often circular) in order to be able to focus the capture on the source of interest (meaning the user) by applying antenna processing (typically beamforming methods). This makes it possible to improve the quality of the signals received, and to eliminate interactions with the surrounding noise and the room effect.

This type of solution is not satisfactory because it is optimized for a specific category of sources: voice signals, sources limited to a portion of the space. It is not suitable for capturing wideband signals (or outside the voice bandwidth). In addition, voice assistants are generally placed at human height (typically on a table) and their capture is degraded by the presence of noise sources in their vicinity (television, radio, etc.) and by furniture which obstruct the propagation of sound.

More generally, microphone arrays that can be designed for the context of audio ambient intelligence are typically linear or spherical. Linear geometry is not optimal, because it requires a large number of sensors for effective capture. In addition, this type of geometry (linear or spherical) requires placing the antenna in the middle of the room to take advantage of its omnidirectional coverage, which is incompatible with the constraint of discreet devices. On the other hand, by placing the acoustic antenna close to a wall, the geometry is suboptimal in the sense that the microphones pointed at the wall are unnecessary, and can even be a source of interference (capture of unwanted reflections for example).

SUMMARY OF CERTAIN INVENTIVE ASPECTS

The invention improves the situation.

A sound capture device is proposed, comprising at least:

a plurality of microphone capsules (for example electrostatic or piezoelectric capsules, electrets, or MEMS), distributed over a portion P of a sphere S circumscribed between two or three planes perpendicular to each other, the three planes intersecting at a point corresponding to the center of the sphere S, and the two planes intersecting in a straight line passing through the center of the sphere S, and the sphere portion P being such that $P=n\,S/8$, with $n=1,2$, a processing unit connected to the capsules to receive the signals captured by the capsules, said processing unit being arranged to:

matrix the signals in an ambisonic representation which retains only the ambisonic components associated with spherical harmonics that are symmetrical in relation to at least two of the aforementioned planes, and process a matrix thus obtained in order to identify at least one sound source in a space surrounding the sphere portion, and to interpret a sound signal originating from this source.

Thus, such a device can be discreetly inserted, for example, in an upper corner of a room or between a wall and a ceiling. In addition, an advantage of such an implementation is that the number of capsules to be provided can be reduced in comparison to what is usually required by an implementation based on a solid sphere. In particular, the reflections from the ceiling and from the wall or walls are used here to limit the number of spherical harmonics to be taken into account and thus to retain a limited number of ambisonic components. Indeed, the walls assumed to be rigid induce a large number of zero components. Only harmonics satisfying the symmetry can be used.

In an embodiment where $n=1$ and the capsules are then distributed over an eighth of a sphere, the retained ambisonic components are associated with spherical harmonics that are symmetrical in relation to each of the three perpendicular planes intersecting at the center of the sphere S.

It is thus possible to select only the harmonics presenting such symmetries.

In such an embodiment, the device may further comprise an attachment support suitable for fixing the device in an upper corner of a room defined by two perpendicular walls and a ceiling overhanging the walls, the walls and the ceiling being coincident with the abovementioned three perpendicular planes and acting as sound wave-reflecting walls.

As will be seen further below with reference to FIG. 3, these reflections make it possible to consider virtual sources, mirrors of real sources, which can contribute to increasing the precision in detecting a source for example. There are thus both virtual sources and virtual microphones which supplement the real microphones and thus constitute a complete sphere.

With an eighth of a sphere to be considered, the retained ambisonic components are associated with spherical harmonics having a degree 1 and an order m (the pairs {1, m} of FIG. 3 described below), such that:

1 and m are even AND m is greater than or equal to 0.

In such an embodiment, the number of retained ambisonic components is equal to (A+1)(A+2)/2 where A is the integer part of half of a maximum degree L of the spherical harmonics with which the retained ambisonic components are associated.

As will be seen in the exemplary embodiments presented below, the aforementioned maximum degree L is greater than 4 and preferably greater than 6.

In the embodiment where n=2 and therefore the capsules are distributed over a quarter of a sphere, the retained ambisonic components are associated with spherical harmonics that are symmetrical in relation to two perpendicular planes intersecting in a straight line passing through the center of the sphere S.

In such an embodiment, the device may further comprise an attachment support suitable for fixing the device in a room corner defined by a wall and a ceiling that are perpendicular to each other, the wall and the ceiling being coincident with said two perpendicular planes and acting as sound wave-reflecting walls.

In either of the aforementioned embodiments (n=1 or 2), the capsules can be positioned on a Gauss-Legendre spherical grid, and in this case, the device preferably comprises a number N of capsules given by:

$N=2n/8\ (L+1)^2$ (or $N=n/4\ (L+1)^2$), where L is a maximum degree of the spherical harmonics associated with the retained ambisonic components.

In such an embodiment, the processing unit can be configured to decompose the signals coming from the microphone capsules, into the spherical harmonics associated with the retained ambisonic components, using a matrixing of the type:

b=C EYGs, where:

- b is a vector matrix containing the retained ambisonic components,
- C is a real constant (for example C=8 in the case of an eighth of a sphere presented below),
- E is a diagonal matrix containing radial equalization filters of each capsule,
- Y is a matrix containing the spherical harmonics with which the retained ambisonic components are associated, and
- G is a diagonal matrix containing integration weights of a Gauss-Legendre grid for each of the capsules,
- s being a vector containing signals coming from the capsules.

In such an embodiment, the processing unit can be further configured to then weight the vector b by a steering vector given in azimuth and in elevation relative to a reference system defined by the center of the sphere S and the three intersections between the three planes. For example, a scanning of this angle of the steering vector may be provided in order to probe for the various sources of a room.

In one embodiment, the device may comprise a plurality of sphere portions P=n S/8, with n=1,2 (compact or separated, forming a system for example with several shells of sphere portions), each comprising a plurality of microphone capsules distributed over each sphere S portion P, and the processing unit is further arranged to process the signals coming from the capsules of each sphere portion separately by matrixing, and to refine, by cross-checking on the matrices thus obtained, the identification of at least one sound source in a space surrounding the sphere portions.

Indeed, such an embodiment based on several sphere portions makes it possible to increase the signal-to-noise ratio by cross-checking the various processed signals coming from the capsules of these sphere portions. It is then typically possible to refine a source detection, for example, or remove ambiguities, or be able to take advantage of a better point of view (more precisely "point of listening") on the target source.

The invention also relates to a method implemented by a processing unit of a device of the above type, wherein:

the signals captured by the capsules are matrixed in an ambisonic representation which retains only the ambisonic components associated with spherical harmonics that are symmetrical in relation to at least two of the aforementioned planes, and the matrix thus obtained (typically a vector of ambisonic components for example) is processed to identify at least one sound source in a space surrounding the sphere portion, and to interpret a sound signal originating from this source. The listening can thus be focused, for example, in a given direction.

Such an embodiment can be illustrated by way of example by the flowchart of FIG. 6, in which, following the obtaining of signals from the capsules in step S0, a matrixing of these signals is carried out in step S1 to obtain the aforementioned vector b of ambisonic components. This vector b can be weighted in step S2 by a steering vector as presented above. Optionally, it is possible to provide in step S3 a processing of signals originating from several sphere portions P to produce the weighted vectors b(A), b(B), etc. specific to each portion A, B, etc. Such an embodiment makes it possible to refine the detection of source(s) in step S4 for a better interpretation of the sound signal SIG originating from this (or these) source(s). It is thus possible, for example in an embodiment where the device is used as a voice assistant, to distinctly recognize a command COM in step S5.

The invention also relates to a computer program comprising instructions for implementing the above method when this program is executed by a processor.

This may typically be the processor PROC of a processing unit UT as illustrated by way of example in FIG. 7, further comprising:

an input interface IN for receiving the signals coming from the capsules, a memory MEM storing at least the instruction data of such a computer program within the meaning of the invention, the processor PROC able to cooperate with the memory MEM in order to read these instructions and thus execute the method illustrated by way of example in FIG. 6, and an output interface OUT able to deliver, for example, the interpreted command signal COM (or in an alternative the sound signal originating from the detected source, or in another alternative processed ambisonic signals making it possible to identify a sound source generating the signal SIG).

Alternatively, the output OUT can deliver the interpretation of the sound event(s) (alarm, dog barking, person falling, etc., or any other situation characterized by the identified sounds), and any information associated with this event (temporal and/or spatial location).

The invention also relates to a non-transitory computer-readable storage medium on which is stored a program for implementing the above method when this program is executed by a processor.

As indicated above, this can be the aforementioned memory MEM.

BRIEF DESCRIPTION OF THE DRAWINGS

Other features, details, and advantages will become apparent upon reading the detailed description below, and analyzing the accompanying drawings, in which.

DETAILED DESCRIPTION OF CERTAIN ILLUSTRATIVE EMBODIMENTS

Figure 1:
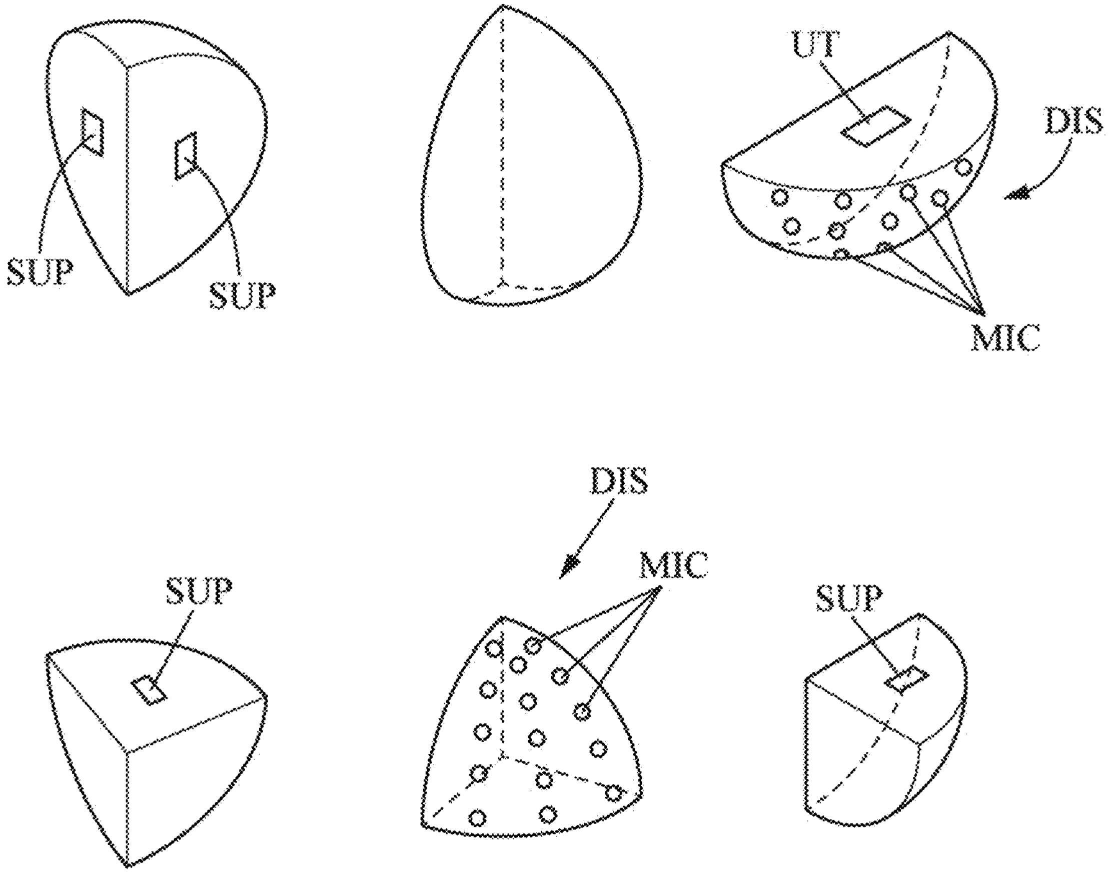
FIG. 1 shows exemplary embodiments of sphere portions.

Reference is now made to FIG. 1 in which a device within the meaning of the invention DIS is in the form of a fourth of a sphere (upper part of FIG. 1) or in the form of an eighth of a sphere (lower part of FIG. 1). The surface of these sphere portions is gridded (in a chosen manner which may correspond to the Gauss-Legendre spherical grid as described below) and microphone capsules MIC are arranged on this grid in a number which can also be determined by the aforementioned Gauss-Legendre grid. These capsules MIC are connected to a processing unit UT (visible in the upper part of FIG. 1) in order to receive the captured sound signals and process them by matrixing into an ambisonic representation as described in detail below.

Furthermore, as can also be seen in FIG. 1, the device DIS can further comprise an attachment support SUP for attaching it, for example:

in an upper corner of a room (between two perpendicular walls and a ceiling) for an eighth of a sphere as shown at the bottom of FIG. 1, or at an edge between a wall and the ceiling for a quarter-sphere as illustrated at the top of FIG. 1.

The invention thus proposes a capture device composed of one or more basic arrays of capsules MIC which can be distributed for example in a room of a building. The geometry of a basic array is a fraction of a sphere (⅛ or ¼) which naturally fits into the upper corners of a room so as to fit snugly into its architecture, or even at a room's intersecting edge between a ceiling and a wall, in order to take advantage of reflections on such walls. The obtained assembly of capture systems is thus very discreet, considerably reducing the number of microphones while maintaining high directivity, and offers wide coverage of ambient sounds in the room. Indeed, as the microphones are located high up, they benefit from a favorable capture point for the entire room without interference from furniture or users close by.

Although the high positioning improves the coverage of the room, there should be allowance for a single array not covering the entire room. Particularly if the room has a complex geometry (presence of recesses, areas of sound shadow with no direct wave), it is preferable to have several arrays. One embodiment then relates to a processing which collectively exploits the information coming from the various arrays of sensors in order to acquire a reliable and complete representation of the captured sound scene. Obtaining a plurality of results concerning the presence of possible sound source(s) makes it possible to cross-check this information and thus ultimately improve a signal-to-noise ratio of the detection of source(s).

In addition, the choice of a spherical geometry is advantageous in the sense that it allows obtaining (by combining the microphones with an appropriate processing of antenna signals) a high directivity with a small number of sensors. Indeed, in the case of a spherical geometry, the processing of the antenna signals uses spherical harmonic functions in a so-called "ambisonic" context. In the case limited to a fraction of a sphere, the conventional harmonic functions cannot be applied directly and they should be adapted to the geometry chosen for the array of microphones, according to one embodiment.

In addition, the choice of positions of the microphones on the sphere fraction is to be optimized. The optimal grid must satisfy the best compromise between the number of sensors (to be minimized) and the quality of the information captured (which requires a minimum number of sensors). This is a problem of spatial sampling to be adapted to a sphere fraction.

The family of spherical harmonics forms a basis. Each spherical harmonic is described by its degree 1 and its order m. At degree 1, there are (21+1) spherical harmonics. Up to the maximum degree L, there are $(L+1)^2$ harmonics. In an ambisonic context, a spherical array of microphones is usually used for decomposition of a sound pressure field on the basis of spherical harmonics, a representation of this illustrated in FIG. 2. Each row of FIG. 2 relates to a degree 1 and the representation up to degree L which includes all components up to that degree. Thus, for degree 1=0 we have only one component. For degree 1=1, we have 1 (first row)+3 (second row)=4 ambisonic components. For degree 1=2, we have 9 components, etc.

As a general rule, if the array is designed to perform a decomposition up to the maximum degree L of the ambisonic components), it must be capable of estimating $Q=(L+1)^2$ components. For an accurate decomposition, the number of microphones, N, must be greater than or equal to the number Q of components to be estimated.

Figure 2:
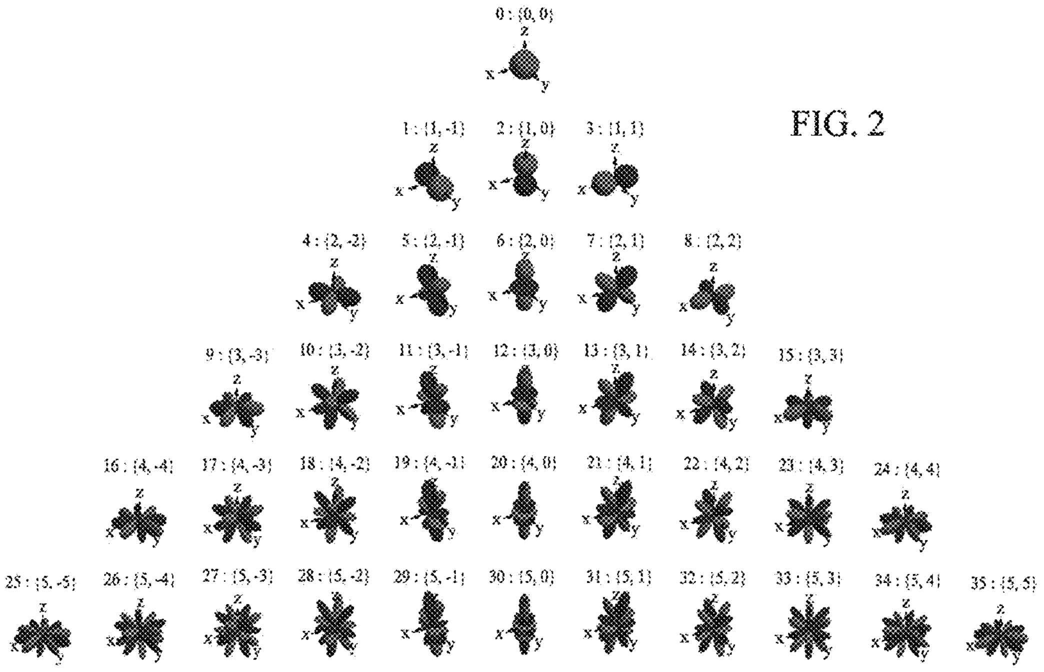
FIG. 2 shows the directivities of spherical harmonics up to the maximum degree L=5, the two shades of color respectively representing the positive and negative values.

FIG. 2 shows the directivities of the spherical harmonics up to the maximum degree L=5. They are arranged in a pyramid by increasing order of degree 1 and order m: {1; m}.

For the implementation of the embodiment described here, only the components of the harmonics having symmetry in relation to a plane of reflection of the sound wave (a wall or the ceiling) are retained. These various planes are denoted Oxy (the ceiling), Oxz (a wall), and Oyz (another wall in the case where ⅛th of a sphere is used rather than a quarter of a sphere).

The reason for this selection of components is explained as follows, with reference to FIG. 3. In the situation on the left in FIG. 3 where a source (for example a loudspeaker) and a sensor (a microphone MIC) are placed close to an acoustically rigid wall (labeled MUR in FIG. 3), the sound pressure at the sensor is the sum of:

the pressure radiated by the source without the wall, and the pressure resulting from reflection on the rigid wall.

Figure 3:
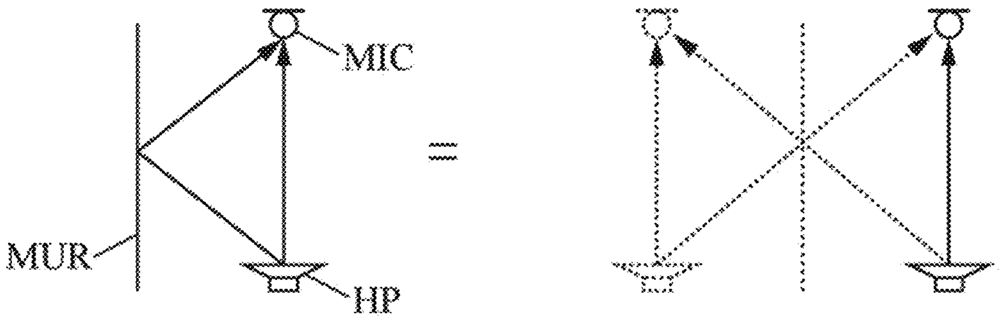
FIG. 3 illustrates the principle of a source and an image microphone in the case of acoustic reflection (on an enclosing surface such as a wall of a room, a ceiling).

It is also possible to solve mathematically the equations related to this configuration by eliminating the wall and adding a source and an image microphone, symmetrical in relation to the wall, as shown on the right side in FIG. 3. This then involves "acoustic images", the wall acting as a "mirror" of the sound wave.

The pressure received by the image sensor is assumed to be the same as that received by the actual sensor without the wall.

The symmetry with respect to plane Oyz (typically a wall) requires that the spherical harmonics of degree 1 and of order m such that:

m is greater than or equal to 0 AND m is even, OR m<0 AND m is odd (and therefore presenting symmetry in relation to plane Oyz) are already a first selection of the harmonics whose components are retained.

In addition, the symmetry in relation to plane Oxy (typically the ceiling) requires that the spherical harmonics of degree 1 and of order m such that:

the sum 1+m is even (and therefore presenting symmetry in relation to plane Oxy) are then a second selection of the harmonics whose components are to be retained.

Thus, for a quarter of a sphere (fitting into an intersection between two planes), the conditions can be:

m is greater than or equal to 0 AND m is even OR m<0 AND m is odd AND (1+m) is even.

Of course, this is an example of an embodiment where the device is fixed between a wall and the ceiling, for example planes Oxy and Oyz. It may also be fixed between two walls Oyz and Oxz and it is advisable to add the condition of symmetry m greater than or equal to 0, which is specific to Oxz, to the previous condition relating to Oyz (m is greater than or equal to 0 AND m is even, OR m<0 AND m is odd), which ultimately amounts to m is greater than or equal to 0 AND m is even.

In any case, we find the same number of spherical harmonics to be retained, regardless of the two planes of symmetry chosen.

For an eighth of a sphere, it is also possible to take into account the symmetry in relation to plane Oxz (typically another wall), which imposes that the spherical harmonics of degree 1 and of order m such that:

m is greater than or equal to 0

(and therefore presenting a symmetry in relation to plane Oxz) are, with the above conditions, the harmonics whose components are retained.

These conditions for an eighth of a sphere can ultimately be summarized as follows:

1 is even AND m is greater than or equal to 0 AND m is even.

For a fixed maximum degree denoted L, the total number of harmonics satisfying the symmetries in relation to planes Oxy, Oxz, Oyz collectively is given by:

$$\tilde{Q} = \frac{\left(\left\lfloor \frac{L}{2} \right\rfloor + 1\right)\left(\left\lfloor \frac{L}{2} \right\rfloor + 2\right)}{2} \quad \text{Math. 1}$$

L/2 denoting the integer part of L/2.

Thus, by following a reasoning with acoustic images (as seen above with reference to FIG. 3), it is possible to use a ⅛ or ¼ fraction of a sphere (or even possibly ½ but this is of no real interest for an application in a building as presented above), and to place acoustically rigid walls in the appropriate planes in order to generate image microphones. We can then use the resulting spherical array of microphones for decomposition on the basis of the spherical harmonics still represented in this configuration, i.e., those meeting the conditions stated previously for 1 and m. Furthermore, the image microphones receive the same pressure as the corresponding real microphones. Consequently, during projection, the components in the spherical harmonics which do not satisfy the above symmetries (conditions on 1 and m) are considered to be zero. For example, in FIG. 2, up to the maximum degree L=5, there are only six spherical harmonics which meet these conditions and which are symmetrical in relation to planes Oxy, Oxz, Oyz collectively and it would then be sufficient to have the minimum of N=6 microphones on ⅛ of a sphere (in baffle) to be able to estimate the components of the acoustic field in these harmonics.

Figure 4:
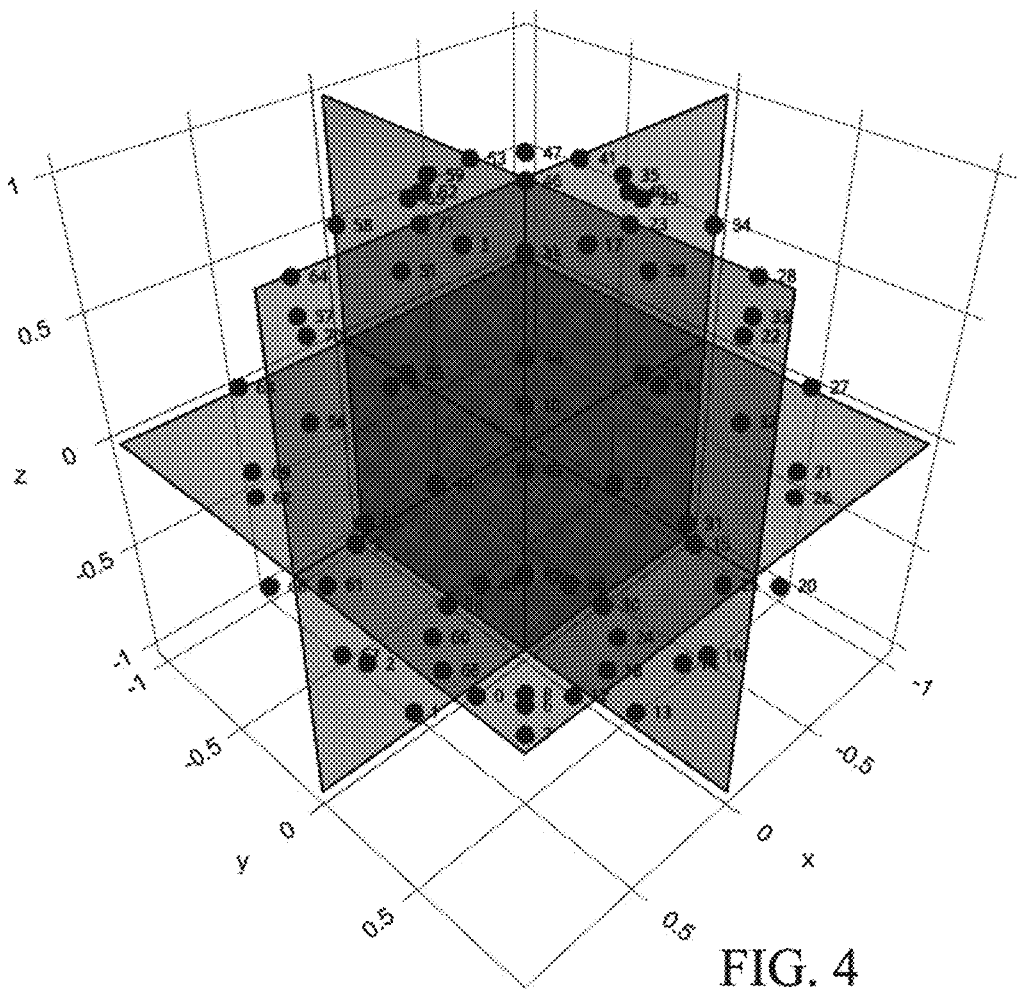
FIG. 4 illustrates an array of real microphones on a ⅛ sphere fraction and image microphones (gray shaded) generated by reflections on rigid walls.

In the context of sphere portions with reflections, the choice is made in particular to create a grid as illustrated in FIG. 4, called "Gauss-Legendre spherical grid", which gives the number and the position of the microphones on a sphere in order to estimate the decomposition up to a chosen maximum degree L. By choosing L as odd, the resulting grid satisfies the symmetries in relation to the planes Oxy, Oxz, Oyz collectively. For example, FIG. 4 shows a grid with N=72 microphones, capable of making a precise decomposition up to the maximum degree L=5 (with $N=2(L+1)^2$ to comply with the aforementioned Gauss-Legendre grid which imposes twice the number of capsules, minimum, required $(L+1)^2$).

Here, using only the nine microphones (nine points illustrated by a different shade in FIG. 4) and with the help of the grayshaded walls in the figure, it is possible to generate sixty-three image microphones. Because of the symmetries, here only six components are non-zero.

Figure 5:
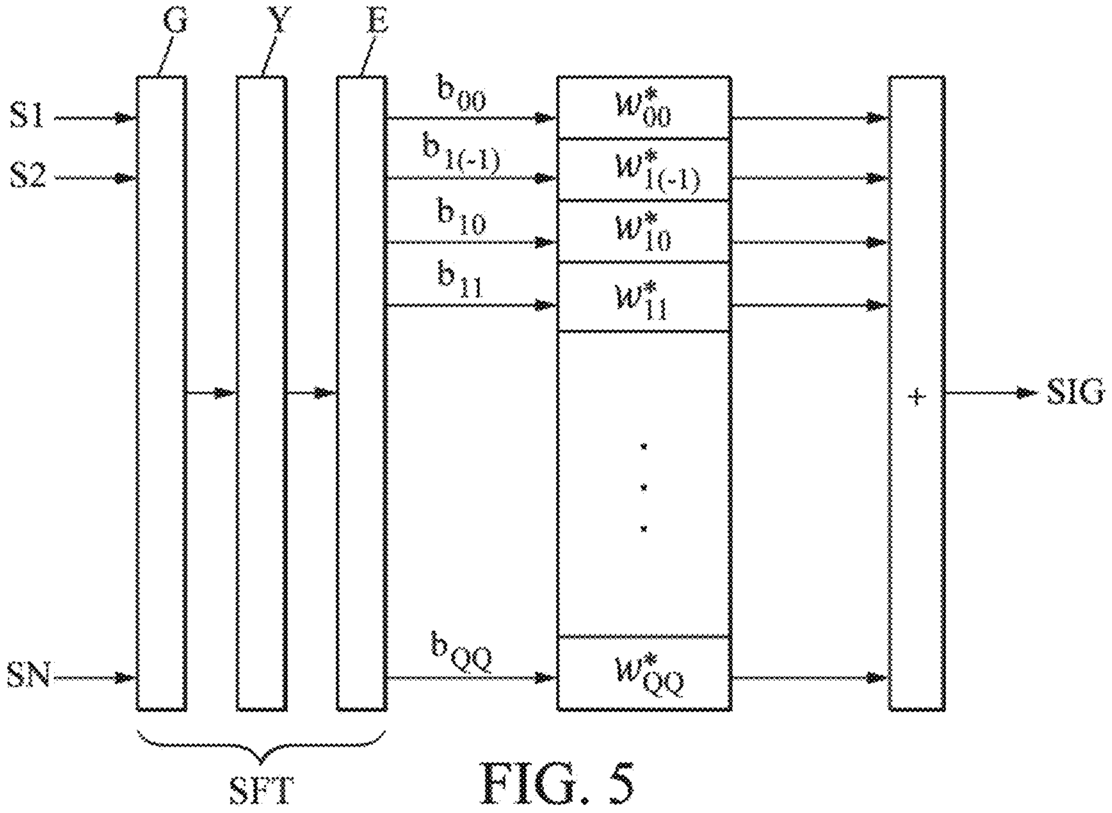
FIG. 5 shows an example of beamforming using spherical harmonics.
Figure 6:
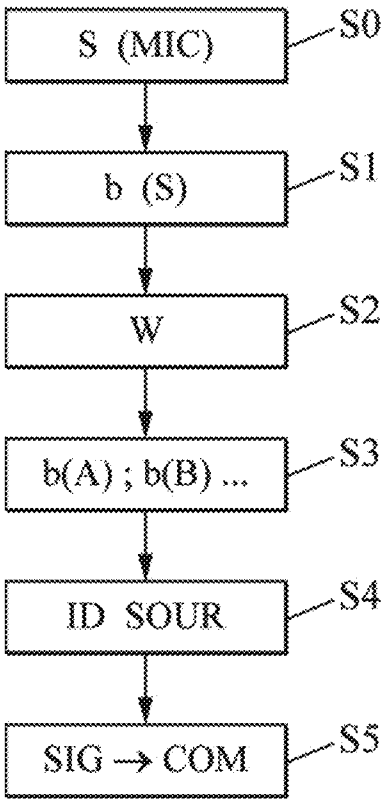
FIG. 6 shows an example of a flowchart defining a succession of steps of a method according to one embodiment.
Figure 7:
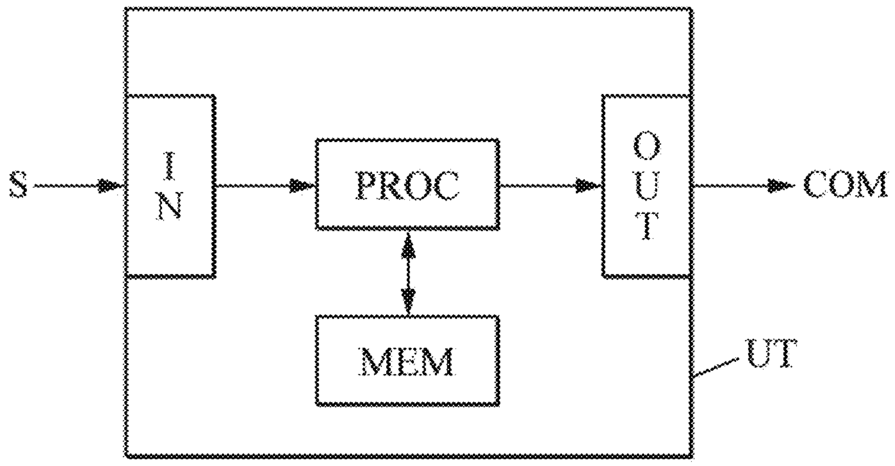
FIG. 7 shows an example structure of a processing unit UT of a device according to one embodiment.

As illustrated in FIG. 5, the signals from the microphones S1, S2, . . . , SN, are decomposed (for example in the frequency domain) into the spherical harmonics, using an equation of the type:

$b$=8EYGs, where:

b is a vector containing the ambisonic components associated with the spherical harmonics satisfying the aforementioned symmetries, E is a diagonal (square) matrix containing radial equalization filters of each microphone, Y is a matrix (not square because more signals coming from capsules are processed than ambisonic components are output) containing the spherical harmonics satisfying the aforementioned symmetries evaluated at the various directions of the microphones, and G is a diagonal (square) matrix containing integration weights of the Gauss-Legendre quadrature for each of the microphones of the eighth of a sphere, s being a vector containing the signals coming from the microphones.

Such an embodiment amounts to applying a spherical Fourier transform (labeled SFT in FIG. 5).

For beamforming in the field of spherical harmonics, in order to identify one or more sound sources in a space surrounding the sphere portion and thus to interpret a sound signal coming from this source, the spherical harmonic components are first estimated using the above matrix equation. The vector obtained b is then weighted by a steering vector which makes it possible to describe the listening in a steering direction. Finally, the weighted components are summed to obtain the output signal.

Weights $W_{lm}$ can be provided for a regular directivity function, given by the following equation:

$$w_{lm} = Y_{lm}(teta0,\ phi0) \qquad \text{Math. 2}$$

An example of a steering angle can be such that teta0 and phi0 are 45 and 135° respectively (pointing in this example towards the interior of the room). These respective azimuth and elevation coordinates are given relative to the basis formed by the intersections of the three planes Oxy, Oxz, Oyz.

For the example of the eighth of a sphere, the directivity function obtained is the superposition of eight directivity functions of a complete sphere pointing in symmetrical directions relative to the Oxy, Oxz, Oyz planes collectively. This superposition can, however, be a disadvantage for small degrees of L (L<6), and L=7 can be a good compromise between the number of capsules and the quality of the decomposition into spherical harmonics.

In this case, conventionally a minimum of $N=(L+1)^2$ capsules is provided for a good capture quality, i.e., N=64. However, for only one eighth of a sphere, this number should be divided by 8, i.e., the effective number N=8.

Nevertheless, to comply with the aforementioned Gauss-Legendre spherical grid, it is necessary to multiply this number N by 2, so that in the aforementioned embodiment with L=7, one can preferably provide N=16 or more capsules.

In this case, as indicated above, the number of ambisonic components retained is Q=(3+1) (3+2)/2=10.

The invention thus combines the following advantages:

uniform sound pickup over the entire room, the ability to extract a sound source in a given direction by means of the processing of antenna signals (denoising and dereverberation to improve the effective signal-to-noise ratio), a device resulting from this design which is compact and discreet, integrated into and adapting to the configuration of a conventional room.

The invention finds many applications, in particular in:

home automation using connected objects in particular for an audio ambient intelligence system which, based on analysis and recognition of ambient sounds, makes is possible to infer actions and offer services to the inhabitants of a house or to the people of a business (potentially applicable to any living space);

voice assistants with a device for capturing ambient sound, possibly used to capture the voices of users and thus supply data to a voice assistant;

audio surveillance systems for detecting break-ins (broken glass), alarms, the noises of people falling, or others.

The invention claimed is:

1. A sound capture device, comprising at least:

a plurality of microphone capsules, distributed over a portion P of a sphere S circumscribed between two or three planes perpendicular to each other, the three planes intersecting at a point corresponding to a center of the sphere S, and two of the aforementioned planes intersecting in a straight line passing through the center of the sphere S, and the sphere portion P being such that P=n S/8, with n=1,2; and a processing unit connected to the capsules to receive signals captured by the capsules, the processing unit being arranged to:

matrix the signals in an ambisonic representation which retains only ambisonic components associated with spherical harmonics that are symmetrical in relation to at least two of the aforementioned planes, and process a matrix thus obtained in order to identify at least one sound source in a space surrounding the sphere portion, and to interpret a sound signal originating from this source.

2. The device according to claim 1, wherein, for n=1, the capsules being distributed over an eighth of a sphere, the retained ambisonic components are associated with spherical harmonics that are symmetrical in relation to each of the three perpendicular planes intersecting at the center of the sphere S.

3. The device according to claim 2, further comprising an attachment support suitable for fixing the device in an upper corner of a room defined by two perpendicular walls and a ceiling overhanging the walls, the walls and the ceiling being coincident with the three perpendicular planes and acting as sound wave-reflecting walls.

4. The device according to claim 2, wherein the retained ambisonic components are associated with spherical harmonics having a degree 1 and an order m such that:

1 and m are even AND m is greater than or equal to zero (0).

5. The device according to claim 4, wherein the number of retained ambisonic components is greater than or equal to (A+1)(A+2)/2 where A is the integer part of half of a maximum degree L of the spherical harmonics with which the retained ambisonic components are associated.

6. The device according to claim 5, wherein the maximum degree L is greater than 4, and preferably greater than 6.

7. The device according to claim 1, wherein, for n=2, the capsules being distributed over a quarter of a sphere, the retained ambisonic components are associated with spherical harmonics that are symmetrical in relation to two perpendicular planes intersecting in a straight line passing through the center of the sphere S.

8. The device according to claim 7, further comprising an attachment support suitable for fixing the device in a room corner defined by a wall and a ceiling that are perpendicular to each other, the wall and the ceiling being coincident with the two perpendicular planes and acting as sound wave-reflecting walls.

9. The device according to claim 1, wherein the capsules are positioned on a Gauss-Legendre spherical grid, and the device comprises a number N of capsules given by $N=2n/8\ (L+1)^2$, where L is a maximum degree of the spherical harmonics associated with the retained ambisonic components.

10. The device according to claim 9, wherein the processing unit is configured to decompose the signals coming from the microphone capsules, into the spherical harmonics associated with the retained ambisonic components, using a matrixing of the type:

b=C EYGs, where:

b is a vector matrix containing the retained ambisonic components,

C is a real constant,

E is a diagonal matrix containing radial equalization filters of each capsule,

Y is a matrix containing the spherical harmonics with which the retained ambisonic components are associated, and G is a diagonal matrix containing integration weights of a Gauss-Legendre grid for each of the capsules, s being a vector containing signals coming from the capsules.

11. The device according to claim 10, wherein the processing unit is further configured to weight the vector b by a steering vector given in azimuth and in elevation relative to a reference system defined by the center of the sphere S and three intersections between the three planes.

12. The device according to claim 1, comprising a plurality of sphere portions P=n S/8, with n=1,2, each comprising a plurality of microphone capsules distributed over each sphere S portion P, and wherein the processing unit is further arranged to process the signals coming from the capsules of each sphere portion separately by matrixing, and to refine, by cross-checking on the matrices thus obtained, the identification of at least one sound source in a space surrounding the sphere portions.

13. A method implemented by a processing unit of a device according to claim 1, wherein:

the signals captured by the capsules are matrixed in an ambisonic representation which retains only the ambisonic components associated with spherical harmonics that are symmetrical in relation to at least two of the aforementioned planes, and the matrix thus obtained is processed to identify at least one sound source in a space surrounding the sphere portion, and to interpret a sound signal originating from this source.

14. A non-transitory computer-readable storage medium on which is stored a computer program comprising instructions for implementing the method according to claim 13 when this program is executed by a processor.

* * * * *